(12) United States Patent
Fukuda

(10) Patent No.: US 7,489,377 B2
(45) Date of Patent: Feb. 10, 2009

(54) LIQUID CRYSTAL DISPLAY DEVICE

(75) Inventor: Koichi Fukuda, Mobara (JP)

(73) Assignee: Hitachi Displays, Ltd., Mobara-shi (JP)

( * ) Notice: Subject to any disclaimer, the term of this patent is extended or adjusted under 35 U.S.C. 154(b) by 225 days.

(21) Appl. No.: 11/605,261

(22) Filed: Nov. 29, 2006

(65) Prior Publication Data

US 2007/0121029 A1 May 31, 2007

(30) Foreign Application Priority Data

Nov. 29, 2005 (JP) ............................ 2005-343580

(51) Int. Cl.
*G02F 1/1335* (2006.01)
(52) U.S. Cl. ......................................... 349/117; 349/96
(58) Field of Classification Search ................. 349/117
See application file for complete search history.

(56) References Cited

U.S. PATENT DOCUMENTS

| 6,433,846 B1 * | 8/2002 | Omar et al. .................. 349/112 |
| 2001/0003472 A1 | 6/2001 | Hiraishi | |
| 2003/0156233 A1 | 8/2003 | Ohsumi | |

FOREIGN PATENT DOCUMENTS

| JP | 2001-166116 | 6/2001 |
| JP | 2001-166302 | 6/2001 |
| JP | 2002-231027 | 8/2002 |

* cited by examiner

*Primary Examiner*—Michelle R. Connelly-Cushwa
*Assistant Examiner*—Chris Chu
(74) *Attorney, Agent, or Firm*—Antonelli, Terry, Stout & Kraus, LLP.

(57) ABSTRACT

It is an object of the present invention to provide a liquid crystal display device with a back-side prism type backlight in order to prevent a stain in an image displayed and attain high brightness.

A liquid crystal display device comprises: a first substrate; a second substrate arranged on the viewer side compared with the first substrate; a liquid crystal held between the first substrate and the second substrate; a light guide plate arranged on the back surface of the first substrate; a polarization plate arranged between the first substrate and the light guide plate; a prism sheet arranged between the light guide plate and the polarization plate and having prisms provided on the light guide plate side; a diffusion layer arranged between the prism sheet and the polarization plate; and a light control sheet arranged between the diffusion layer and the polarization plate. The light control sheet rotates the polarization of the light emitted from the diffusion layer.

10 Claims, 3 Drawing Sheets

LIQUID CRYSTAL DISPLAY DEVICE

CLAIM OF PRIORITY

The present application claims priority from Japanese Application JP 2005-343580 filed on Nov. 29, 2005, the content of which is hereby incorporated by reference into this application.

BACKGROUND OF THE INVENTION

1. Field of the Invention

The present invention relates to liquid crystal display devices, and more particularly to a technique suitable for application to back-side prism type backlights.

2. Description of the Related Art

TFT (Thin Film Transistor) liquid crystal display modules with small color liquid crystal display panels of about 240× 320×3 subpixels are widely used as display units in mobile appliances such as cell phones.

Such liquid crystal display modules for cell phones can be improved in brightness by employing back-side prism type backlights.

FIG. 5 provides a cross sectional view of a main portion illustrating the outlined structure of a conventional liquid crystal display module for cell phone, the module using a back-side prism type backlight.

As shown in FIG. 5, the conventional liquid crystal module for cell phone has a liquid crystal display panel and a back-side prism type backlight which illuminates the liquid crystal display panel.

The backlight comprises: a light guide plate 6 having a nearly rectangular shape similar to the plane shape of the liquid display panel; white light emitting diodes 8 disposed at one side surface (incident surface) of the light guide plate 6; a reflection sheet 7 disposed on the bottom surface (opposite to the liquid crystal display panel side) of the light guide plate 6; a back-side prism sheet 5 disposed on the top surface (liquid crystal display panel side) of the light guide plate 6; and a diffusion sheet 4 disposed on the top surface of the back-side prism sheet 5. The back-side prism sheet 5 is a prism sheet having prisms on the side of the light guide plate 6.

The liquid crystal panel has a liquid crystal cell 2, an upper polarization plate 1 attached to the top surface (display surface) of the liquid crystal cell 2 and a lower polarization plate 3 attached to the bottom surface (backlight side) of the liquid crystal cell 2.

The technical documents related to the present invention include:

[Patent Document 1] Japanese Patent Laid-Open No. 2001-166116

[Patent Document 2] Japanese Patent Laid-Open No. 2001-166302

SUMMARY OF THE INVENTION

A back-side prism type backlight can efficiently obtain the front luminance with use of refraction properties of prisms without diffusion by dots. However, the emitted light has polarization characteristics.

Due to the polarization characteristics, if it does not match the transmission axis angle of the lower polarization plate 3 that is disposed on the side of the backlight, the light emitted from the backlight is absorbed by the lower polarization plate 3, resulting in lowering the transmittance of the liquid crystal display panel 1.

To solve this problem, use of a light control sheet which rotates the direction of the maximum degree of polarization is described in Patent Documents 1 and 2.

However, the conventional techniques described in the above Patent Documents 1 and 2 have the following problems:

(1) In the case of Patent Document 2, since a diffusion sheet is not used, it is difficult to suppress the in-plane unevenness of luminance due to undulations of the prism sheet and the occurrence of moire due to the angle of the arranging direction of prisms on the prism sheet relative to that of pixels.

(2) In the case of Patent Document 1, although the base sheet for prisms is designed to have a function as a light control sheet, adding a diffusion sheet reduces the effect of the light control sheet since the birefringence of the diffusion sheet is not taken into consideration. Since the diffusion sheet has birefringence properties, the polarization axis of the transmitting light is rotated by a different angle for each of R, G and B wavelengths. Likewise, the diffusion sheet causes a different ellipticity of polarization for each of the wavelengths. Therefore, since the diffusion sheet is present between the light control sheet and the lower polarization plate, the polarization of light is disturbed by the diffusion sheet before the light enters the lower polarization plate even if the light control sheet controls the polarization. This reduces the efficiency of polarization control by the light control sheet.

(3) Since there is no consideration of the wavelength dependence of the light before entering the light control sheet, images displayed on the liquid crystal display panel may be stained.

(4) Since there is no consideration of a method of fixing the light control sheet, the light control sheet may have an undulation.

The present invention was made to solve the above-cited conventional technical problems. It is an object of the present invention to provide a technique that prevents a stain in an image displayed by a liquid crystal display device with a back-side prism type backlight and that attains high brightness in the image.

The above and other objects and novel features of the present invention will become apparent with reference to the description of the present specification and the accompanying drawings.

An outline of representative inventions disclosed in this specification will be briefly described below.

(1) A liquid crystal display device comprising: a first substrate; a second substrate arranged on the viewer side compared with the first substrate; a liquid crystal held between the first substrate and the second substrate; a light guide plate arranged on the rear side compared with the first substrate; a polarization plate arranged between the first substrate and the light guide plate; a prism sheet arranged between the light guide plate and the polarization plate and having prisms on the light guide plate side; a diffusion layer arranged between the prism sheet and the polarization plate; and a light control sheet arranged between the diffusion layer and the polarization plate and rotating the polarization of light emitted from the diffusion layer.

(2) A liquid crystal display device according to (1) wherein the light control sheet rotates the polarization of the light emitted from the diffusion layer so that the angle of the transmission axis of the polarization plate relative to a straight line connected between two points at which each of the R, G and B components of the light emitted from the light diffusion layer has almost the same amplitude in the polarization characteristics falls within the range of ±10°.

(3) A liquid crystal display device according to (2) wherein, the following expressions are satisfied:

$$-0.03 \leq (A2-A1)/A1 \leq 0.03 \text{ and } -0.03 \leq (A3-A1)/A1 \leq 0.03$$

where A1 is any one of the amplitudes of the R, G and B components, and A2 and A3 are the amplitudes of the other two components at the straight line.

(4) A liquid crystal display device according to any one of (1) through (3) wherein the light control sheet is a λ/2 retardation plate.

(5) A liquid crystal display device according to any one of (1) through (4) wherein the light control sheet is arranged in contact with the polarization plate.

The following provides a brief description of effects which can be attained by the representative inventions disclosed in this specification:

According to the present invention, liquid crystal display devices that each use a back-side prism type backlight can prevent a stain in an image displayed while attaining high brightness.

DESCRIPTION OF THE PREFERRED EMBODIMENTS

An embodiment of the present invention will be described below in detail with reference to the drawings.

Each of components having the same function is given the same numeral reference in all the drawings to explain the embodiment to avoid an unnecessary repetition.

Embodiment

Figure 1:
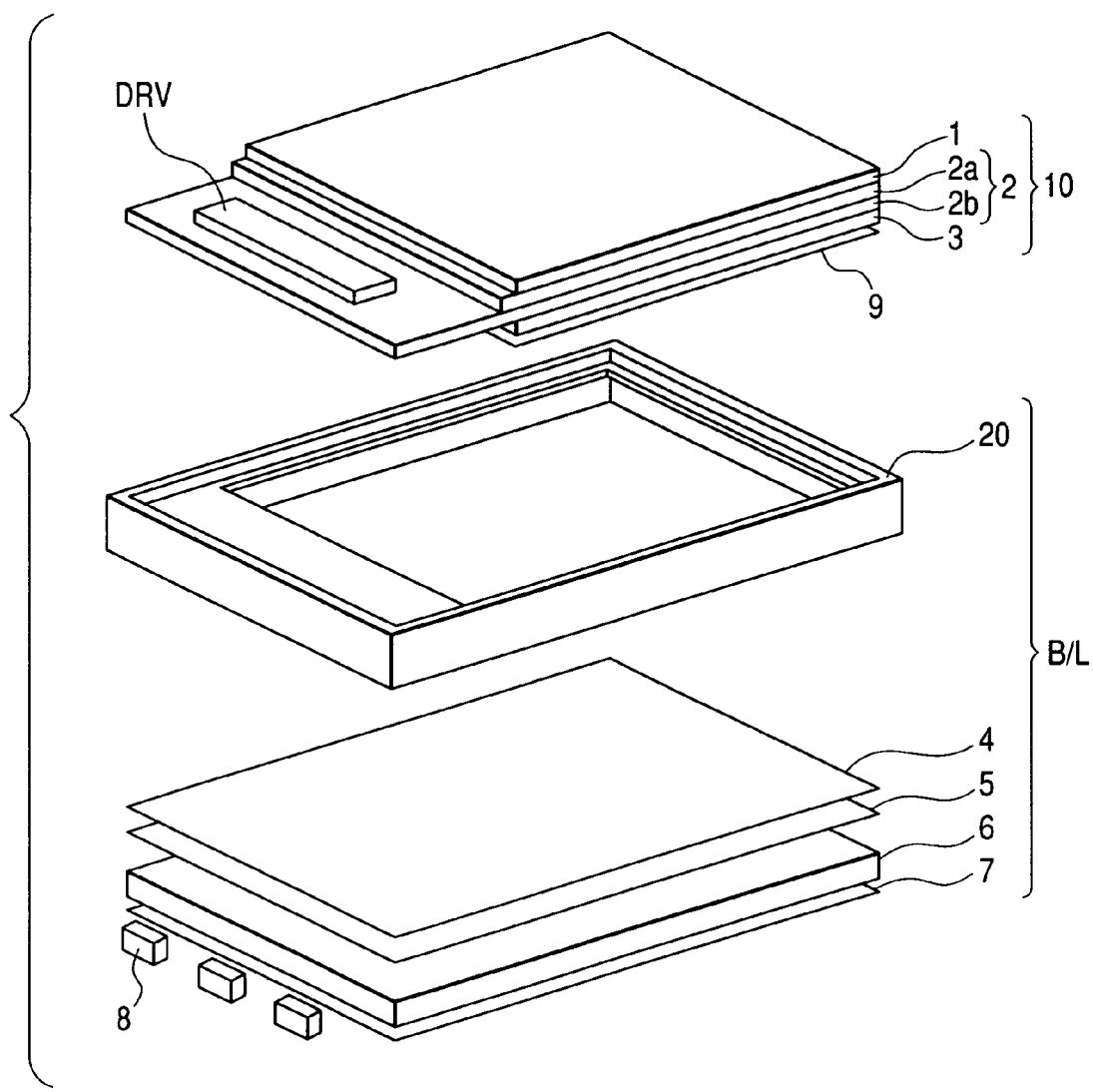
FIG. 1 is an exploded perspective diagram schematically showing the structure of a liquid crystal display module for cell phone according to an embodiment of the present invention.
Figure 2:
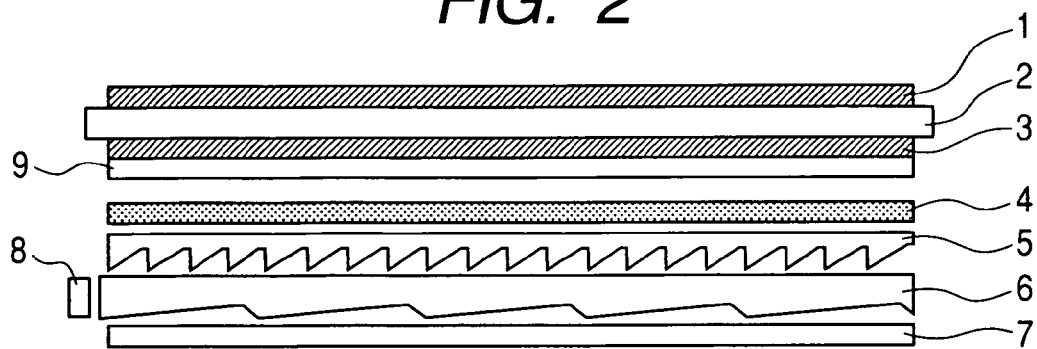
FIG. 2 is a cross sectional view of the main part schematically showing the structure of the liquid crystal display module for cell phone according to the embodiment of the present invention.

FIG. 1 is an exploded perspective diagram which schematically shows the structure of a liquid crystal display module for cell phone according to the embodiment of the present invention. FIG. 2 is a cross sectional view of the main part schematically showing the structure of the liquid crystal display module for cell phone according to the embodiment of the present invention.

As shown in FIGS. 1 and 2, like the abovementioned conventional liquid crystal display module, the liquid crystal module according to the embodiment of the present invention has a liquid crystal display panel 10 and a back-side prism type backlight (B/L) for illuminating the liquid crystal display panel 10.

The backlight (B/L) includes: a light guide plate 6 having a substantially rectangular shape similar to the plane shape of the liquid display panel 10; white light emitting diodes (light sources) 8 disposed at one side surface (incident surface) of the light guide plate 6; a reflection sheet 7 disposed on the bottom surface (opposite to the liquid crystal display panel side) of the light guide plate 6; a back-side prism sheet 5 disposed on the top surface (liquid crystal display panel side) of the light guide plate 6; a diffusion sheet (diffusion layer) 4 disposed on the top surface of the back-side prism sheet 5; and a resin frame 20. The back-side prism sheet 5 has prisms provided on side of the light guide plate 6. The diffusion sheet 4 may be replaced with a diffusion layer formed on the top surface of the back-side prism sheet 5 by means of coating although the diffusion sheet 4 is used in the description of the present embodiment.

The present liquid crystal display module according to the embodiment has the diffusion sheet 4, the back-side prism sheet 5, the light guide plate 6 and the white light emitting diodes 8 arranged in the resin frame 20 in this order, shown in FIG. 1. The reflection sheet 7 is arranged on the bottom surface of the resin frame 20.

The liquid crystal display panel 10 includes: a liquid crystal cell 2; an upper polarization plate 1 attached to the top surface (display surface) of the liquid crystal cell 2; and a lower polarization plate 3 attached to the bottom surface (backlight side) of the liquid crystal cell 2. Although not shown in the figure, a retardation plate may be included between the upper polarization plate 1 and the liquid crystal cell 2. In addition, a retardation plate (not shown) may be included between the lower polarization plate 3 and the liquid crystal cell 2.

The liquid cell 2 comprises a glass substrate (or called a TFT substrate) 2b and a glass substrate (or called a opposite substrate). On the glass substrate 2b, pixel electrodes, thin film transistors and the like are formed. Color filters and the like are formed on the glass substrate 2a. To construct the liquid crystal cell 2, the two substrates are overlapped with each other with a predetermined space left between them and bonded to each other by means of a frame-shaped sealing material formed near the edges between the substrates. After that, liquid crystal is filled into the sealing material placed between the substrates from a liquid crystal inlet formed in a portion of the sealing material, and the inlet is sealed. In addition, a semiconductor chip (DRV) which includes a driver and the like is mounted on the glass substrate 2b.

Figure 5:
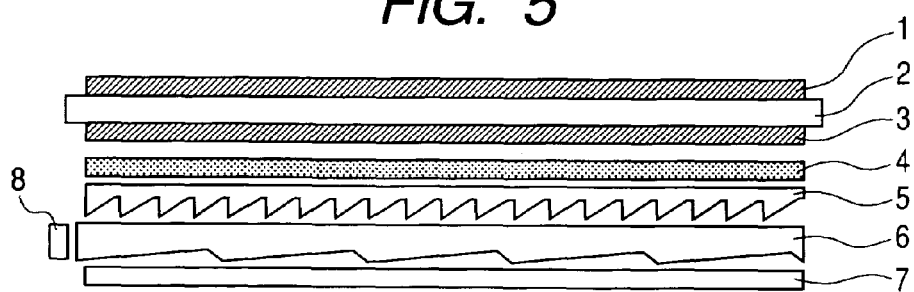
FIG. 5 provides a cross sectional view of the main part schematically showing a conventional liquid crystal display module for cell phone, which uses a back-side prism type backlight.

Note that the resin frame 20 and the semiconductor chip (DRV) are omitted in FIGS. 2 and 5. Further, although a flexible wiring substrate is mouthed on the glass substrate 2b in order to supply control signals and the like to the semiconductor chip (DRV), this flexible wiring substrate is omitted in FIGS. 2 and 5.

The present embodiment is different from the abovementioned conventional liquid crystal display module in that a light control sheet 9 is arranged between the lower polarization plate 3 and the diffusion sheet 4. Although the light control sheet 9 is preferably made in contact with the lower polarization plate 3, the present invention is not limited to this arrangement. To arrange the light control sheet 9 in contact with the lower polarization plate 3, an adhesive is preferably used the light control sheet 9 rotates the polarization (polarization direction) of the light emitted from the backlight (B/L) before the light enters the lower polarization plate 3.

Figure 3:
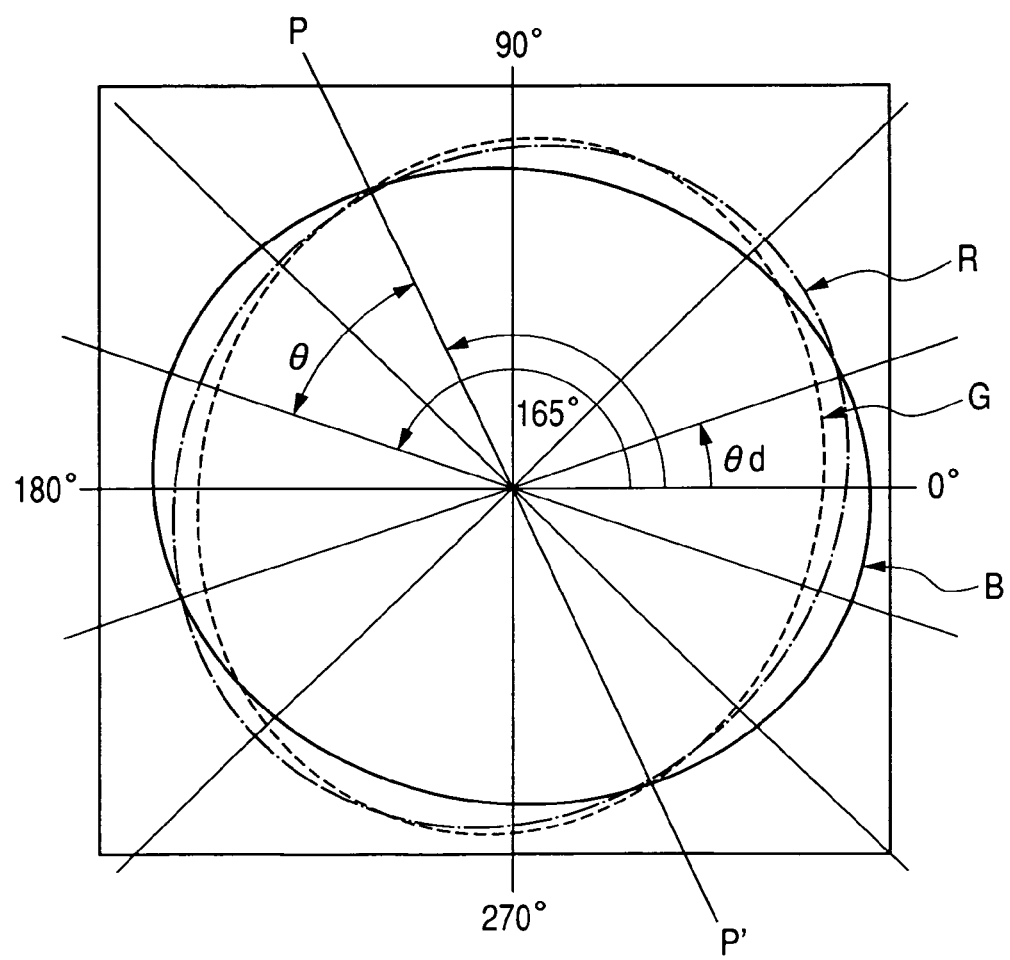
FIG. 3 is a schematic diagram to show how polarization characteristics of R, G and B components of light emitted from the diffusion sheet varies in the present liquid crystal display module according to the embodiment of the present invention.

FIG. 3 is a schematic diagram to indicate how the polarization characteristics of the R, G and B components of the light emitted from the diffusion sheet 4 varies in the liquid crystal display module according to the embodiment of the present invention.

In FIG. 3, the angle is measured counterclockwise with the horizontal direction of the screen (left-right direction in the figure) as the reference (0°).

In FIG. 3, R, G and B indicate the polarization characteristics of the red (R), green (G) and blue (B) components of the light, respectively.

As shown in FIG. 3, each of the polarization characteristics of the R, G and B components of the light emitted from the diffusion sheet 4 are substantially elliptical.

The light control sheet 9 rotates the polarization of the light emitted from the diffusion sheet 4.

However, the diffusion sheet 4 exhibits a birefringence dependent on the wavelength. Thus, each of the R, G and B components of the light emitted from the diffusion sheet 4 has a different direction of the maximum amplitude of polarization (the longitudinal axis direction of the ellipse of each of the R, G and B components shown in FIG. 3). Therefore, images displayed on the display surface of the liquid crystal display panel may be stained if the angle of rotation is not appropriately set.

In the present embodiment, the light control sheet 9 rotates the polarization of the R, G and B components of the light emitted from the diffusion sheet 4 so that a straight line (P-P' in FIG. 3) connected with two points at which each of R, G and B has the same amplitude match the transmission axis of the lower polarization plate 3. For example, if the transmission axis of the lower polarization plate 3 has an angle of 165° in FIG. 3, the light control sheet 9 rotates the polarization of the light emitted from the diffusion sheet 4 by θ as shown in FIG. 3.

This equalizes the amplitudes of the R, B and G components incident on the liquid crystal display panel 10. Therefore, a stain is prevented from being produced in a image displayed on the display surface of the liquid crystal display panel 10.

Note that the above description is the best case of the embodiment. In practical products, it is difficult to completely equalize the amplitudes. Thus, the light control sheet 9 maybe designed to rotate the polarization of the light emitted from the diffusion sheet 4 so that the angle (narrower angle) of the transmission axis of the lower polarization plate 3 relative to the straight line (P-P' in FIG. 3) connected with the two points at which each of R, G and B has the same amplitude falls within the range of ±10° (preferably ±5° and more preferably ±2.5°).

It is noted that the R, G and B components of the light emitted from the diffusion sheet 4 do not always have the same amplitude, in terms of the polarization characteristics of the R, G and B components of the light emitted from the diffusion sheet 4. Therefore, points where the R, G and B components have substantially the same amplitude are used while a certain degree of error (difference) is accepted. With respect to the straight line (P-P' in FIG. 3) connected with the points where the R, G and B have substantially the same amplitudes, for example, the error may be tolerable when the following expressions are satisfied:

$$-0.03 \leq (A2-A1)/A1 \leq 0.03 \text{ and } -0.03 \leq (A3-A1)/A1 \leq 0.03$$

where, $A1$ is any one of amplitudes of the R, G and B components, and $A2$ and $A3$ are the amplitudes of the other two components.

Figure 4:
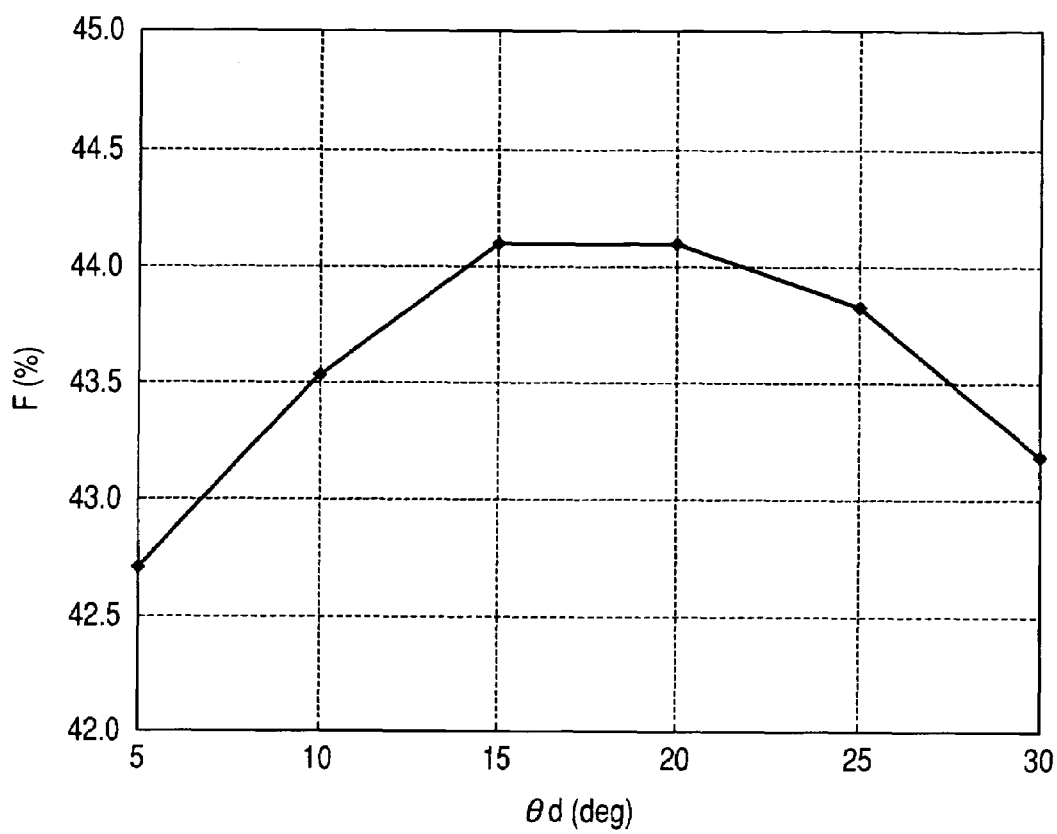
FIG. 4 shows the relationship between the transmittance (F) of the lower polarization plate and the slow axis angle (θd) of the λ/2 retardation plate, where the light control sheet shown in FIG. 2 is composed of a λ/2 retardation plate.

For example, the light control sheet 9 is composed of a λ/2 retardation plate made of cycloolefin-based material. FIG. 4 is a graph showing how the transmittance (F) of the lower polarization plate 3 depends on the retardation axis angle (θd) of the λ/2 retardation plate that forms the light control sheet 9. θd is measured as shown in FIG. 3.

From this graph, it is understood that the lower polarization plate 3 can obtain high transmittance (F) when the retardation axis angle (θd) of the λ/2 retardation plate satisfies the relation 7.5°≤θd≤27.5°. This fact means that the light control sheet 9 rotates the polarization direction P-P' of FIG. 3 so that the angle of the P-P' line placed after the rotation relative to the transmission axis of the lower polarization plate 3 falls within the range of ±10°. In addition, FIG. 4 shows a peak value when 7.5°≤θd≤27.5°. This means that the light control sheet 9 rotates the polarization direction P-P' of FIG. 3 so that the angle of the P-P' line placed after the rotation relative to the transmission axis of the lower polarization plate 3 falls within the range of ±2.5°.

The abovementioned Patent Document 1 describes that a stretched film having birefringence is disposed to a back-side prism base sheet (32A), the polarization axis direction of the base sheet (32A) is set so that the polarization direction of the light which has passed through the base sheet (32A) substantially match the polarization axis of the lower polarization plate and a diffusion sheet (40) is added as necessary.

According to Patent Document 1, however, since the diffusion sheet (40) is disposed above the base sheet (32A), polarization is disturbed due to the birefringence of the diffusion sheet (40). This lowers the effects of the base sheet (32A).

The abovementioned Patent Document 2 describes that the prism sheet (12), which is a mono-axially stretched film or uni-axially stretched film, rotates the direction of the maximum degree of polarization of the light emitted from the light guide plate (4) toward the transmission axis direction of the polarization plate (14) in order to increase the amount of light of polarization components passing through the polarization plate, and a separate light control sheet to rotate polarization is also provided.

According to Patent Document 2, however, no diffusion sheet is used between the backlight (B/L) and the liquid crystal display panel 10 to prevent optical interference. In this configuration, it is possible that optical interference (moiré) may occur, making it impossible to attain uniform effects in the in-plane direction.

In the case of the present embodiment, on the other hand, since the light control sheet 9 is arranged between the diffusion sheet 4 and the lower polarization plate 3, the light incident on the lower polarization plate 3 can be rotated in consideration of the birefringence of the diffusion sheet (40). Therefore, even if the polarization is disturbed due to the birefringence of the diffusion sheet (40), the effects of the light control sheet 9 are not reduced. Further, the diffusion sheet 4 can suppress the occurrence of moiré.

In addition, in Patent Documents 1 and 2, since the lower polarization plate and the light control sheet are separately arranged, it is possible that conditions for obtaining the maximum intensity of light may not be stably attained due to an assembly misalignment.

Further, in Patent Documents 1 and 2, since the surface of the light control sheet is not fixed, the light control sheet may have an undulation. If the light control sheet is pressed by another sheet to prevent such an undulation, moire may occur due to interference with this sheet.

If a diffusion sheet is added on the light control sheet to prevent a moire pattern, the control performance of the light control sheet may be deteriorated. It is not possible to attain uniform effects in the in-plane direction.

In the case of the present embodiment, the light control sheet 9 is arranged in contact with the lower polarization plate 3. This can reduce the influence of the assembly misalignment between the lower polarizer sheet 3 and the light control sheet 9 and prevent the light control sheet 9 from having an undulation.

While the present invention has been described above in detail based on the embodiment thereof, it is to be understood that the present invention is not limited to the embodiment and various modifications may be made thereto without departing from the spirit of the invention.

What is claimed is:

1. A liquid crystal display device comprising:
a first substrate;
a second substrate arranged on the viewer side compared with the first substrate;
a liquid crystal held between the first substrate and the second substrate;
a light guide plate arranged on the back surface of the first substrate;
a polarization plate arranged between the first substrate and the light guide plate;
a prism sheet arranged between the light guide plate and the polarization plate and having prisms provided on the light guide plate side;
a diffusion layer arranged between the prism sheet and the polarization plate; and
a light control sheet arranged between the diffusion layer and the polarization plate;
wherein the light control sheet rotates the polarization of the light emitted from the diffusion layer.

2. A liquid crystal display device according to claim 1, wherein
the light control sheet rotates the polarization of the light emitted from the diffusion layer so that the angle of the transmission axis of the polarization plate relative to a straight line connected with points where each of R, G and B components of the light emitted from the light diffusion layer has substantially the same amplitude in the polarization characteristics falls within the range of ±10°.

3. A liquid crystal display device according to claim 2, wherein
the following expressions are satisfied:

$$-0.03 \leq (A2-A1)/A1 \leq 0.03 \text{ and } -0.03 \leq (A3-A1)/A1 \leq 0.03$$

where, A1 is any one of amplitudes of the R, G and B components, and A2 and A3 are the amplitudes-of the other components at the straight line.

4. A liquid crystal display device according to claim 1, wherein the light control sheet is a λ/2 retardation plate.

5. A liquid crystal display device according to claim 1, wherein the light control sheet is arranged in contact with the polarization plate.

6. A liquid crystal display device comprising:
a first substrate;
a second substrate arranged on the viewer side compared with the first substrate;
a liquid crystal held between the first substrate and the second substrate;
a light guide plate arranged on the back surface of the first substrate;
a polarization plate arranged between the first substrate and the light guide plate;
a prism sheet arranged between the light guide plate and the polarization plate and having prisms provided on the light guide plate side;
a diffusion sheet arranged between the prism sheet and the polarization plate; and
a light control sheet arranged between the diffusion sheet and the polarization plate;
wherein the light control sheet rotates the polarization of the light emitted from the diffusion sheet so that the angle of the transmission axis of the polarization plate relative to a straight line connected with points where each of R, G and B components of the light emitted from the diffusion sheet has substantially the same amplitude in the polarization characteristics falls within the range of ±10°.

7. A liquid crystal display device according to claim 6, wherein
the following expressions are satisfied:

$$-0.03 \leq (A2-A1)/A1 \leq 0.03 \text{ and } -0.03 \leq (A3-A1)/A1 \leq 0.03$$

where, A1 is any one of the amplitudes of the R, G and B components, and A2 and A3 are the amplitudes of the other components at the straight line.

8. A liquid crystal display device according to claim 6, wherein the light control sheet is a λ/2 retardation plate.

9. A liquid crystal display device according to claim 6, wherein the light control sheet is arranged in contact with the polarization plate.

10. A liquid crystal display device comprising:
a first substrate;
a second substrate arranged on the viewer side compared with the first substrate;
a liquid crystal held between the first substrate and the second substrate;
a light guide plate arranged on the back surface of the first substrate;
a polarization plate arranged between the first substrate and the light guide plate;
a prism sheet arranged between the light guide plate and the polarization plate and having prisms provided on the light guide plate side thereof;
a diffusion layer arranged between the prism sheet and the polarization plate; and
a light control sheet arranged between the diffusion layer and the polarization plate;
wherein the light control sheet is arranged in contact with the polarization plate and rotates the polarization of the light emitted from the diffusion layer.

* * * * *